(12) United States Patent
Moon (10) Patent No.: US 11,934,502 B2
(45) Date of Patent: Mar. 19, 2024

(54) RF COMMUNICATION DEVICE EQUIPPING WITH BIOMETRIC SENSOR AND PREVENTING PHYSICAL ANTENNA HACKING

(71) Applicant: AIL Co., Ltd., Suwon-si (KR)

(72) Inventor: Jechun Moon, Suwon-si (KR)

( * ) Notice: Subject to any disclaimer, the term of this patent is extended or adjusted under 35 U.S.C. 154(b) by 260 days.

(21) Appl. No.: 17/543,814

(22) Filed: Dec. 7, 2021

(65) Prior Publication Data

US 2022/0179935 A1 Jun. 9, 2022

(30) Foreign Application Priority Data

Dec. 8, 2020 (KR) .......................... 10-2020-0170157

(51) Int. Cl.
*G06F 21/00* (2013.01)
*G06F 21/32* (2013.01)
*H02J 50/00* (2016.01)
*H02J 50/20* (2016.01)
*H04W 12/108* (2021.01)

(52) U.S. Cl.
CPC ............ *G06F 21/32* (2013.01); *H02J 50/001* (2020.01); *H02J 50/20* (2016.02); *H04W 12/108* (2021.01)

(58) Field of Classification Search
CPC ...... G06F 21/32; G06F 21/62; G06F 21/6245; H02J 50/20; H02J 50/001; H04W 12/108; H04W 12/12; H04L 63/08; H04L 9/3231
See application file for complete search history.

(56) References Cited

U.S. PATENT DOCUMENTS

| 2011/0267190 A1* | 11/2011 | Payson | G06F 21/86 340/539.31 |
| 2012/0324235 A1* | 12/2012 | Bolle | G06F 21/32 713/186 |
| 2020/0169122 A1* | 5/2020 | Prakriya | H01M 10/46 |

FOREIGN PATENT DOCUMENTS

KR 10-1597799 B1 2/2016

* cited by examiner

*Primary Examiner* — Yogesh Paliwal
(74) *Attorney, Agent, or Firm* — KORUS Patent, LLC; Seong Il Jeong (57) ABSTRACT

The present invention provides an RF communication device equipping with a biometric sensor and preventing physical antenna hacking, the RF communication device comprising: a power supply unit; an RF communication unit including a processor connected to the power supply unit, a biometric sensor connected to the processor, a memory connected to the processor and storing biometric information, an RF driving switch connected to the processor, an RF communication module connected to the RF driving switch, and a first RF antenna; and a physical hacking determination unit connected to the RF driving switch to periodically exchange data for verification, wherein the physical hacking determination unit deletes the biometric information and/or a unique ID when communication of the verification data is disconnected or an abnormal signal is received.

5 Claims, 5 Drawing Sheets

RF COMMUNICATION DEVICE EQUIPPING WITH BIOMETRIC SENSOR AND PREVENTING PHYSICAL ANTENNA HACKING

FIELD OF THE INVENTION

The present invention relates to an RF communication device equipped with a biometric sensor, and more particularly, to an RF communication device equipping with a biometric sensor and preventing physical antenna hacking by detecting physical hacking of an RF communication device and protecting the device from hacking.

BACKGROUND OF THE INVENTION

Biometric sensors are currently widely used to authenticate an individual's identity. For example, in addition to fingerprint recognition, iris recognition, and face recognition, which are widely applied to smartphones and tablets, various biometric technologies such as voice recognition and vein recognition have been introduced. Furthermore, other types of biometric sensors are also being developed depending on the target of biometrics. Since the biometric technology does not require an additional input process or authentication means such as a security key, the biometric sensors are being more widely adopted in diverse fields.

Some biometric sensors are mounted on RF communication devices for security purpose. For example, a fingerprint sensor is mounted in a smart card having an RF communication function. However, since communication traffic increases while the RF communication device with biometric information transmits biometric information during the authentication process, communication is likely to be delayed and consume a lot of power. To reduce communication traffic with an RF reader, some RF communication devices equip with a memory, in which biometric information is stored.

Even though mounting a memory storing biometric information on an RF communication device can reduce communication traffic with the RF reader, another problem arises. If a physical hacking occurs on the RF communication device, biometric information about an individual may be leaked, and the leaked biometric information can be used for various identity authentication or financial transactions. This is a serious weakness of the conventional RF communication device equipping with a memory storing biometric information. Furthermore, this current RF communication devices do not have a function to detect a physical hacking from the outside. Accordingly, there is an urgent need for a novel security technology capable of protecting an RF communication device from physical hacking.

PRIOR ART (Patent Document 0001) Korean Patent Registration No. 10-1597799 (Registered on Feb. 19, 2016)

Technical Problem

An object of the present invention is to provide an RF communication device having security means that can protect biometric information stored in a memory of an RF communication unit from physical hacking.

SUMMARY OF THE INVENTION

The present invention relates to an RF communication device equipping with a biometric sensor and preventing physical antenna hacking, the RF communication device comprising: a power supply unit; an RF communication unit including a processor connected to the power supply unit, a biometric sensor connected to the processor, a memory connected to the processor and storing biometric information, an RF driving switch connected to the processor, an RF communication module connected to the RF driving switch in series to form a closed circuit with the RF driving switch, and a first RF antenna; and a physical hacking determination unit connected to the RF driving switch of the RF communication unit to periodically exchange data for verification, wherein the physical hacking determination unit deletes at least one of the biometric information stored in the memory and a unique ID stored in the RF communication module when communication of the verification data is disconnected or an abnormal signal is received.

In an embodiment of the present invention, the power supply unit may be a first power supply unit including a second RF antenna and an RF harvesting power conversion unit converting an RF induced power excited by the second RF antenna into power source.

Alternatively, in another embodiment of the present invention, the power supply unit may be a second power supply unit including a battery.

According to another embodiment of the present invention, the power supply unit including: a first power supply unit including a second RF antenna, an RF harvesting power conversion unit converting an RF induced power excited by the second RF antenna into power source, and a super capacitor storing and outputting the power produced by the RF harvesting power conversion unit; a second power supply unit including a battery; an RF contact determination unit detecting whether power conversion from the RF induced power to the power source in the RF harvesting power conversion unit has occurred; and a dual power switching device connected to input terminals of the first power supply unit and the second power supply unit, receiving a signal of the RF contact determination unit as a switching signal, and outputting any one of the power of the first power supply unit and the second power supply unit, wherein the processor of the RF communication unit is connected to an output terminal of the dual power switching device.

In this case, when receiving the switching signal indicating that power conversion has occurred in the RF harvesting power conversion unit from the RF contact determination unit, the dual power switching device may output power of the first power supply unit to the RF communication unit.

In addition, before receiving the switching signal indicating that the power conversion has occurred in the RF harvesting power conversion unit from the RF contact determination unit, the dual power switching device may output power of the second power supply unit to the RF communication unit.

The biometric sensor may be a biometric sensor capable of recognizing at least any one of biometric information among fingerprint information, iris information, face information, voice information, and vein information according to an embodiment.

In addition, the RF communication module may support at least one communication method among NFC, RFID, IR communication, Bluetooth, BLE, ZigBee, WIFI, LTE, and LoRA according to an embodiment of the present invention.

The RF communication device of the present invention may include a smart card, an ID card, or an access control device, in which the biometric sensor is mounted.

Advantageous Effects

An RF communication device of the present invention can detect physical hacking through the RF communication unit by equipping with a physical hacking determination unit, and when a hacking occurs, biometric information stored in a memory and a unique ID stored in an RF communication module are deleted. Accordingly, security of personal identity can be strengthened, and the RF communication device can be protected by being used by the intruder.

Therefore, it is possible to solve the concern that an RF communication device containing valuable biometric information would be illegally misused and cause social and economic damage, thereby increasing the reliability of safe use of an RF communication device.

DETAILED DESCRIPTION EMBODIMENTS OF THE INVENTIONS

Hereinafter, preferred embodiments of the present invention will be described in detail in conjunction with the accompanying drawings. Advantages and features of the present invention, and a method for achieving them will become apparent with reference to the embodiments described below in conjunction with the accompanying drawings. However, the present invention is not limited to the embodiments disclosed below, and may be implemented in various forms. The embodiments are provided to make the assist allow the publication of the present invention to be complete, and are common in the technical field to which the present invention pertains. It is provided to make the disclosure of the present invention complete and fully inform of the scope of the invention to one skilled in the art. The present invention is defined only by the scope of the appended claims. The same reference number refers to the same component throughout the specification.

Unless otherwise defined, all terms, including technical and scientific terms, used herein may be used with a meaning commonly understood by those of ordinary skill in the art to which the present invention belongs. In addition, terms defined in a commonly used dictionary are not to be interpreted ideally or excessively unless clearly specifically defined. The terminology used herein is for the purpose of describing the embodiments and is not intended to limit the present invention. A singular form also includes a plural form unless specifically stated otherwise.

As used herein, "comprises" and/or "comprising" used for referring to a component, step, operation, and/or device does not exclude the presence or addition of one or more other components, steps, operations, and/or device.

Figure 1A:
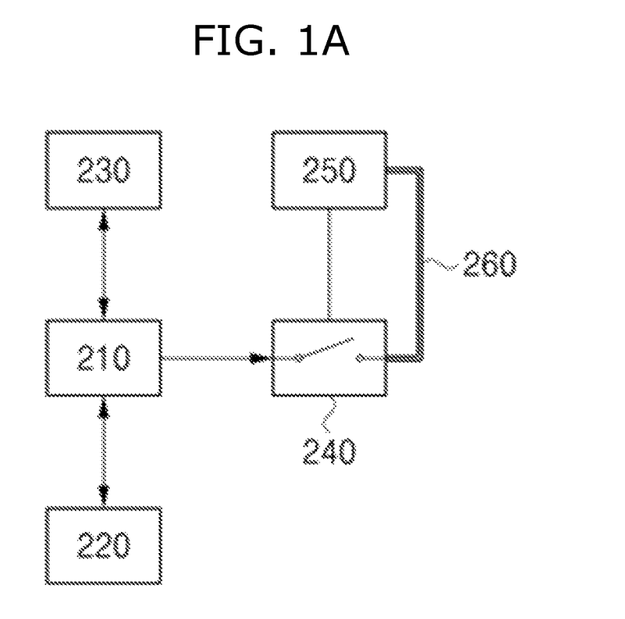
FIG. 1A is a drawing explaining a risk of physical antenna hacking that may occur in a conventional RF communication device equipping with a memory storing biometric information.
Figure 1B:
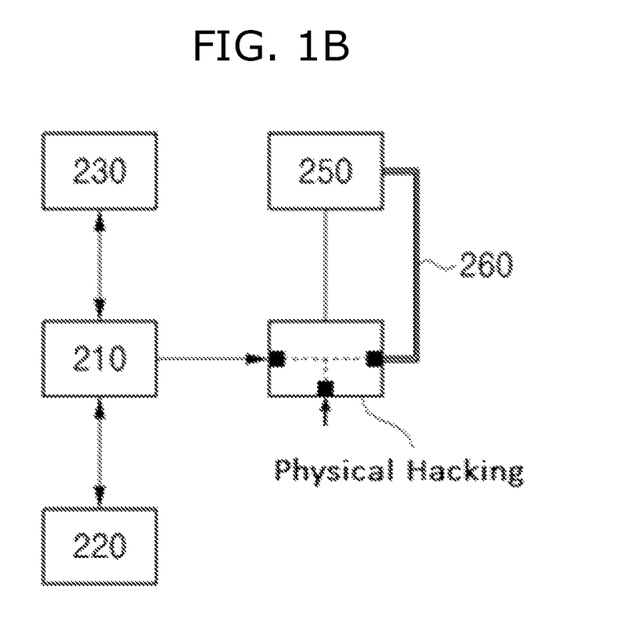
FIG. 1B is a drawing explaining a risk of physical antenna hacking that may occur in a conventional RF communication device equipping with a memory storing biometric information.

FIG. 1A-1B are drawings explaining a risk of physical antenna hacking that may occur in a conventional RF communication device equipping with a memory storing biometric information.

The conventional RF communication device shown in FIG. 1A includes a processor 210 connected to a power supply unit (not shown), a biometric sensor 220 connected to the processor 210, and a memory 230 connected to the processor 210 and storing biometric information. Before initiating RF communication, the processor 210 compares the biometric information input from the biometric sensor 220 with the biometric information stored in the memory 230, and the RF communication will be initiated only when biometric information input from the biometric sensor 220 matches with the biometric information stored in the memory 230 and thus the identity is verified.

An RF communication unit in the conventional RF communication device includes an RF driving switch 240, an RF communication module 250, and a first RF antenna 260. The RF driving switch 240 is connected to the processor 210, and the RF communication module 250 and the first RF antenna 260 are connected to the RF driving switch 240 in series to form a closed circuit with the RF driving switch 240. The processor 210 controls the operation of the RF driving switch 240 only when the biometric information input from the biometric sensor 220 and the biometric information stored in the memory 230 match, and the RF communication module 250 operates according to the operation of the RF driving switch 240.

The conventional RF communication configured as described above may be vulnerable to physical antenna hacking through the RF driving switch 240 of the RF communication unit, and can be easily hacked. As shown in of FIG. 1B, by physically removing or bypassing the RF driving switch 240 and forcibly connecting to the first RF antenna 260, the RF driving switch 240 may be disabled. Physical antenna hacking can illegally acquire a unique ID stored in the RF communication device by accessing the RF communication module 250, or RF communication chip, through the first RF antenna 260 that is forcibly connected, and furthermore, even biometric information stored in the memory 230 can be stolen. Stolen unique IDs and biometric information are exploited to enable unauthorized RF communication. Since leakage of unalterable personal biometric information can be used for illegal identity verification and financial transactions, social and economic damage will be unpredictable.

As described above, even though physical antenna hacking is a risk factor that must be prevented as it invalidates the security function of the biometric sensor 220, the conventional RF communication device cannot detect the physical antenna hacking as well as prevent it. Therefore, there is an urgent need for countermeasures against physical antenna hacking with malicious intent.

Figure 2:
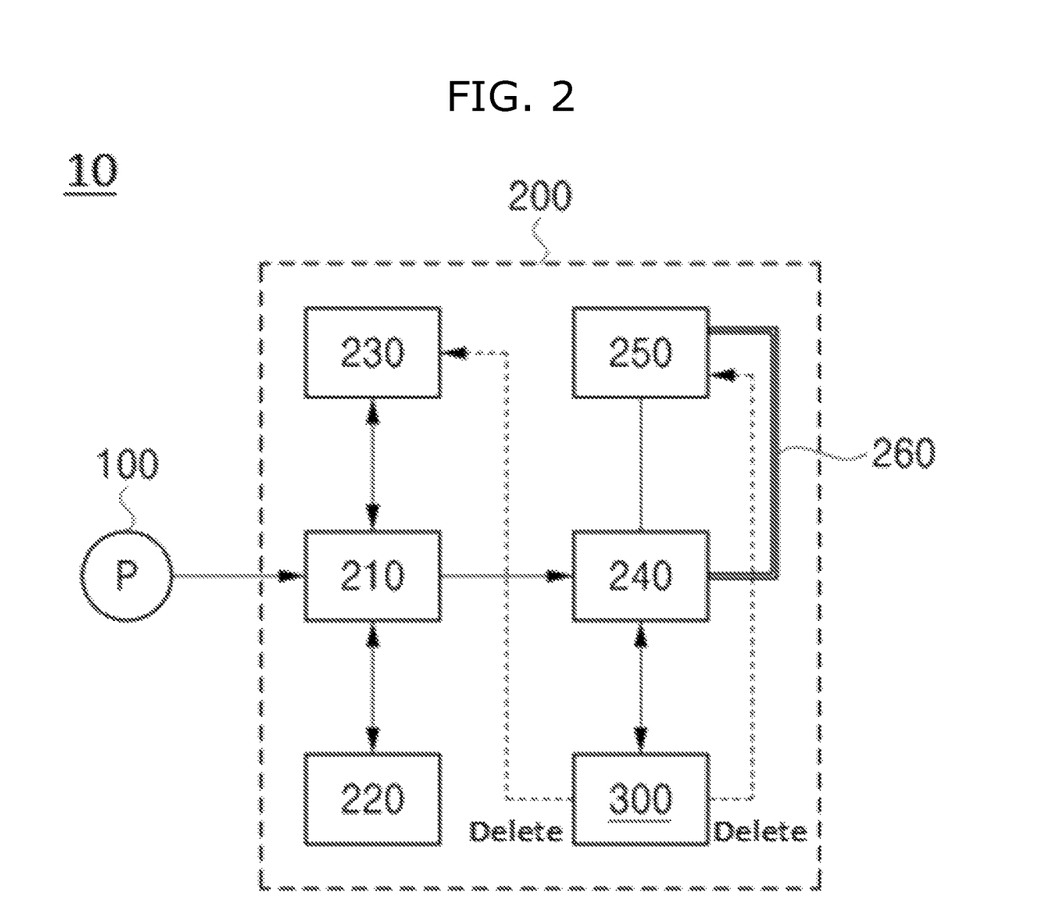
FIG. 2 is a drawing illustrating an overall configuration of an RF communication device preventing physical antenna hacking according to the present invention.

FIG. 2 is a drawing illustrating an RF communication device equipping with a biometric sensor and preventing physical antenna hacking according to the present invention, which can solve the problems of the conventional device. For convenience of description, the present invention is hereafter referred to as "RF communication device preventing physical antenna hacking."

Referring to FIG. 2, the RF communication device 10 preventing physical antenna hacking of the present invention includes a power supply unit 100, an RF communication unit 200, and a physical hacking determination unit 300.

The power supply unit 100 outputs power required for the RF communication unit 200, and the power of the power supply unit 100 is supplied to the processor 210 of the RF communication unit 200. The RF communication unit 200 includes: a processor 210; a biometric sensor 220 connected to the processor 210; a memory 230 storing biometric information; an RF driving switch 240; an RF communication module 250, and a first RF antenna 260. Since basic configuration of the RF communication device is already described with reference to FIG. 1A and FIG. 1B, the detailed description thereof will be omitted to avoid repeated explanation.

The RF communication device 10 preventing physical antenna hacking according to the present invention is characterized by including the physical hacking determination unit 300 connected to the RF driving switch 240 of the RF communication unit 200. The physical hacking determination unit 300 is connected to the RF driving switch 240 to periodically exchange data for verification. During the communication of this verification data, if the communication of the verification data is discontinued or an abnormal signal is received, the physical hacking determination unit 300 determines that unauthorized access from the outside has occurred. Since the physical antenna hacking is committed in a way of destroying or bypassing the RF driving switch 240, the fact that the verification data is not normally returned to the physical hacking determination unit 300 means that physical antenna hacking has occurred in the RF driving switch 240.

The verification data exchanged between the physical hacking determination unit 300 and the RF driving switch 240 should be prepared as data having a certain rule or pattern, so that normal and abnormal can be distinguished. For example, by transmitting and receiving the verification data according to a previously designed encryption and decryption algorithm, the physical hacking determination unit 300 may detect an abnormal signal that does not conform to this encryption and decryption algorithm.

In addition, when the physical hacking determination unit 300 is disconnected from the communication of the verification data or an abnormal signal is received, the physical hacking determination unit 300 instantly performs an operation of deleting at least one of the biometric information stored in the memory 230 and a unique ID stored in the RF communication module 250.

By deleting the biometric information stored in the memory 230, the physical hacking determination unit 300 can prevent the leakage of information proving an individual's identity and prevent the processor 210 from starting the authentication process of the biometric information, which is a condition for initiating RF communication. In addition, by deleting the unique ID stored in the RF communication module 250, RF communication can be completely disabled. In some embodiments, any one of the biometric information stored in the memory 230 or the unique ID stored in the RF communication module 250 may be deleted, thereby preventing illegal RF communication. In another embodiment, both the biometric information stored in the memory 230 and the unique ID stored in the RF communication module 250 may be deleted for thorough security.

Figure 3:
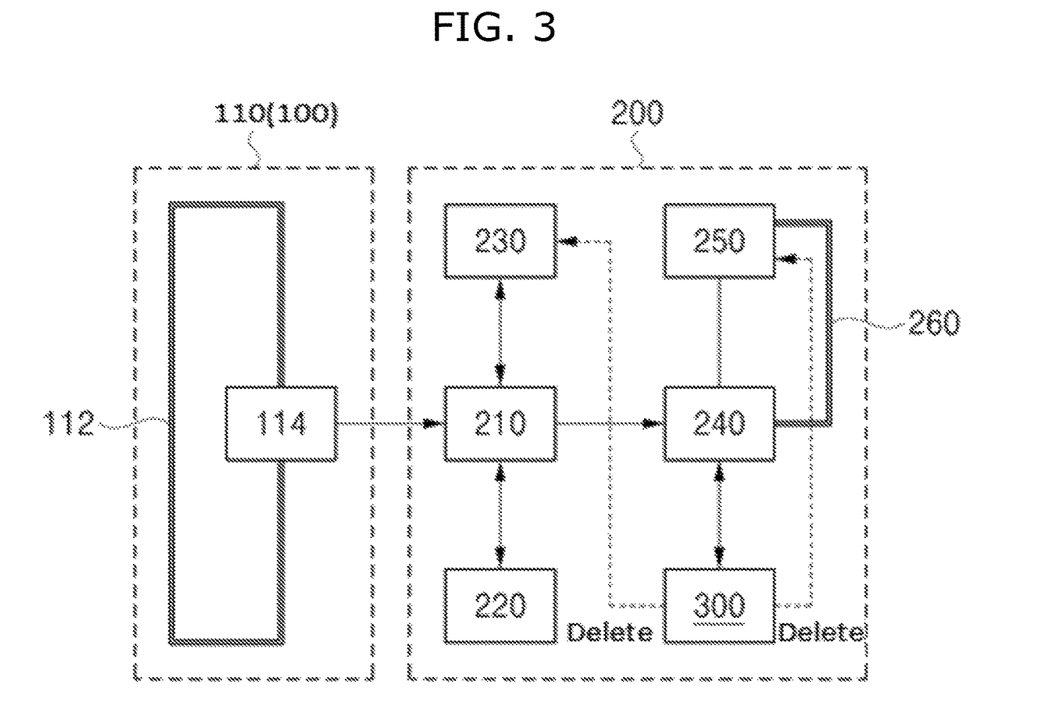
FIG. 3 is a drawing illustrating an embodiment including a first power supply unit that is suitable for short-distance RF communication.
Figure 4:
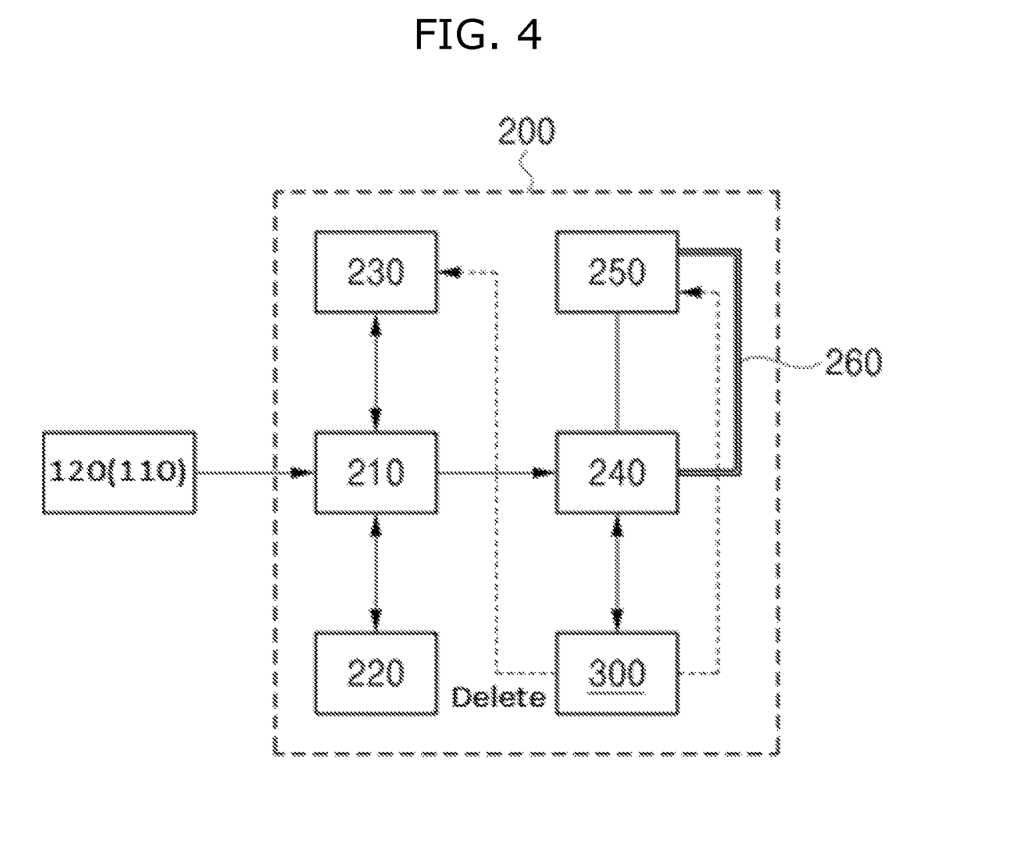
FIG. 4 is a drawing illustrating an embodiment including a second power supply unit that is suitable for long-distance RF communication.
Figure 5:
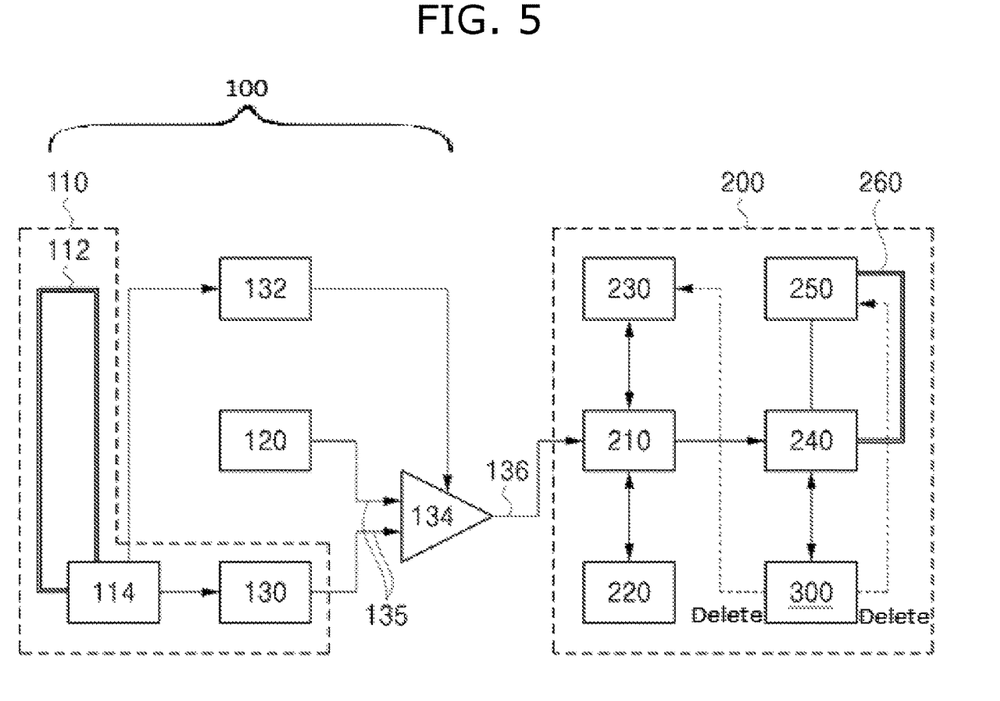
FIG. 5 is a drawing illustrating an embodiment including a hybrid type power supply unit that is suitable for both short-distance and long-distance RF communication.

FIGS. 3 to 5 illustrates various embodiments of the power supply unit 100 that may be provided in the RF communication device 10 preventing physical antenna hacking according to the present invention.

FIG. 3 illustrates a first power supply unit 110 as an embodiment of the power supply unit 100. The first power supply unit 110 includes a second RF antenna 112 and an RF harvesting power conversion unit 114 converting an RF induced power excited by the second RF antenna 112 into power source. The first power supply unit 110 shown in FIG. 3 is an example of the power supply unit 100 suitable for short-range RF communication. That is, since short-distance RF communication with short communication time and low-power consumption can be operated by using energy harvested from electromagnetic waves generated by the RF reader, as power, the RF induced power generated by the second RF antenna 112 through electromagnetic interaction is converted into power source in the RF harvesting power converter 114 and supplied to the RF communication unit 200.

Meanwhile, FIG. 4 illustrates a second power supply unit 120 as another embodiment of the power supply unit 100. The second power supply unit 120 shown in FIG. 4 is an example of the power supply unit 100 suitable for long-distance RF communication and including a battery. The battery may be a primary battery that cannot be charged and needs to be replaced, or a secondary battery that can be charged and discharged. Compared to the first power supply unit 110 harvesting energy, the battery has higher energy storage density. Accordingly, it is suitable to adopt the battery as the second power supply unit 120 for long-distance RF communication with a long communication time and high-power consumption.

FIG. 5 illustrates a hybrid type power supply unit for both short-distance RF communication and long-distance RF communication, as another embodiment of the power supply unit 100.

The power supply unit 100 shown in FIG. 5 is embodied in such a way that the first power supply unit 110 and the second power supply unit 120 are respectively connected to two input terminals 135 of a dual power switching device 134 in parallel, and the RF communication unit 200 is connected to an output terminal 136 of the dual power switching device 134.

In this case, the first power supply unit 110 further includes a super capacitor 130, and the energy converted into power source, which is usable in the RF harvesting power converter 114, is stored in the super capacitor 130. The supercapacitor 130 has enhanced energy storage capability, and has a characteristic of instantaneously outputting high-powered electricity when energy is needed. Therefore, the first power supply unit 110 shown in FIG. 5 can support more stable short-distance RF communication, by using the supercapacitor 130, which has excellent performance in inputting and outputting energy for storing energy harvested from the electromagnetic wave of the RF reader.

In particular, the power supply unit 100 of FIG. 5 is configured to use more appropriate power supply unit between the first and the second power supply unit 110, 120 after determining whether the RF communication is short-range communication or long-distance communication. For the determination process, the power supply unit 100 of FIG. 5 includes an RF contact determination unit 132 as a means for controlling the operation of the dual power switching device 134. The RF contact determination unit 132 detects whether power conversion has occurred in the RF harvesting power conversion unit 114. If the operation of the RF harvesting power conversion unit 114 is detected, the RF contact determination unit 132 outputs one signal corresponding to the detection. The signal output from the RF contact determination unit 132 acts as a switching signal for the dual power switching device 134.

The dual power switching device 134 supplies power to the RF communication unit 200 by outputting the power of a battery of the second power supply unit 120 in a normal state, or in a default state. Then, when the switching signal from the RF contact determination unit 132 is input, the dual power switching device 134 performs a switching operation, which switches the internal circuit to disconnect the second power supply unit 120 and to connect to the first power supply unit 110 instead. By this switching operation, the power from the first power supply unit 110 is supplied to the RF communication unit 200.

If the switching signal is generated from the RF contact determination unit 132, it means that the RF harvesting power conversion unit 114 is operating. In other words, the RF communication device is in proximity or contact with the RF reader, and energy harvesting, in which RF induced power is excited to the second RF antenna 112, is taking place. Therefore, in the embodiment of FIG. 5, the first power supply unit 110 is used in a short-distance RF communication environment in which the RF harvesting power conversion unit 114 operates, and on the contrary, the second power supply unit 120 having a high energy storage density is used in a long-distance RF communication environment in which RF induced power does not occur.

In the power supply unit 100 of FIG. 5, since the power switching operation between the first power supply unit 110 and the second power supply unit 120 is automatically performed by the interaction between the RF contact determination unit 132 and the dual power switching device 134, a user can conveniently use the RF communication unit 200 without additional operation. In addition, since it is advantageous in terms of power management by selectively using one of the two power supply units 110, 120 depending on the communication environment, the lifespan of the RF communication unit 200 can increase.

In addition, as described above, the power supply unit 100 of FIG. 5 is configured to supply the power of the second power supply unit 120 to the RF communication unit 200 in the normal state, or in the default state. Therefore, before receiving the switching signal that the power conversion has occurred in the RF harvesting power conversion unit 114, from the RF contact determination unit 132, the dual power switching device 134 outputs the power of the second power supply unit 120 power to the RF communication unit 200.

In addition, in case that the switching signal from the RF contact determination unit 132 is disconnected during the operation of outputting the power of the first power supply unit 110 to the RF communication unit 200, the dual power switching device 134 automatically outputs the power of the second power supply unit 120 to the RF communication unit 200.

Meanwhile, the biometric sensor 220 applied to the present invention may be various. For example, the RF communication device of the present invention may equip with the biometric sensor 220 capable of recognizing at least any one of biometric information among fingerprint information, iris information, face information, voice information, and vein information, and other biometric sensors can also be applied.

In addition, the RF communication module 250 may support at least one communication method among NFC, RFID, IR communication, Bluetooth, BLE, ZigBee, WIFI, LTE, and LoRA, according to an embodiment of the present invention.

In some embodiments, an RF communication unit 200 of the present invention includes a smart card, an ID card, and an access control device, on which the biometric sensor 220 is mounted.

Although embodiments of the present invention have been described above in conjunction with the accompanying drawings, one skilled in the art to which the present invention pertains can understand that the present invention may be implemented in other specific forms without changing the technical idea or essential features. Therefore, it is apparent that the embodiments described above are illustrative in all respects and not restrictive.

What is claimed is:
1. An RF communication device equipping with a biometric sensor and preventing physical antenna hacking, the RF communication device comprising:
  a power supply unit;
  an RF communication unit including:
    a processor connected to the power supply unit,
    a biometric sensor connected to the processor,
    a memory connected to the processor and storing biometric information,
    an RF driving switch connected to the processor,
    an RF communication module connected to the RF driving switch in series to form a closed circuit with the RF driving switch, and a first RF antenna, and
  a physical hacking determination unit connected to the RF driving switch of the RF communication unit to periodically exchange data for verification,
  wherein the physical hacking determination unit deletes at least one of the biometric information stored in the memory and a unique ID stored in the RF communication module when communication of the verification data is disconnected or an abnormal signal is received,
  wherein the power supply unit comprises:
  a first power supply unit including:
    a second RF antenna,
    an RF harvesting power conversion unit converting an RF induced power excited by the second RF antenna into power, and
    a super capacitor storing and outputting the power produced by the RF harvesting power conversion unit;
  a second power supply unit including a battery;
  an RF contact determination unit detecting whether conversion from the RF induced power to the power in the RF harvesting power conversion unit has occurred; and
  a dual power switching device connected to input terminals of the first power supply unit and the second power supply unit, receiving a signal of the RF contact determination unit as a switching signal, and selectively outputting any one of power of the first power supply unit and the second power supply unit,
  wherein the processor of the RF communication unit is connected to an output terminal of the dual power switching device,
  wherein, when the dual power switching device receive the switching signal indicating that power conversion has occurred in the RF harvesting power conversion unit, from the RF contact determination unit, the dual power switching device outputs power of the first power supply unit to the RF communication unit,
  wherein, before the dual power switching device receive the switching signal indicating that the power conversion has occurred in the RF harvesting power conversion unit, from the RF contact determination unit, the dual power switching device outputs power of the second power supply unit to the RF communication unit, wherein when the RF communication device is in proximity to or contact with an RF reader such that the RF communication device communicates with the RF reader, the RF harvesting power conversion unit converts the RF induced power generated by the RF reader into the power, the power supply from the second power supply unit is cut off, and the first power supply unit operates and supplies the power to the RF communication device, and wherein when RF communication is cut off due to a distance where the RF communication device cannot communicate with the RF reader, the RF harvesting power conversion unit is not driven, so the first power supply unit does not operate, and the second power supply unit supplies the power to the RF communication device.

2. The RF communication device of claim 1, wherein the physical hacking determination unit deletes both the biometric information stored in the memory and the unique ID stored in the RF communication module when communication of the verification data is disconnected or an abnormal signal is received.

3. The RF communication device of claim 1, wherein the biometric sensor recognizes at least any one of biometric information among fingerprint information, iris information, face information, voice information, and vein information.

4. The RF communication device of claim 1, wherein the RF communication module supports at least one communication method among NFC, RFID, IR communication, Bluetooth, BLE, ZigBee, WIFI, LTE, and LoRA.

5. The RF communication device of claim 1, wherein the RF communication device includes a smart card, an ID card, or an access control device in which the biometric sensor is mounted.

* * * * *